United States Patent

Bernheim et al.

[11] Patent Number: 5,310,783
[45] Date of Patent: May 10, 1994

[54] AQUEOUS COMPOSITIONS COMPRISING NITROGEN-CONTAINING POLYSILOXANES

[75] Inventors: Michael Bernheim, Aystetten; Harald Chrobaczek, Augsburg; Günther Tsuchida, Schwabmünchen, all of Fed. Rep. of Germany

[73] Assignee: Ciba-Geigy Corporation, Ardsley, N.Y.

[21] Appl. No.: 954,841

[22] Filed: Sep. 30, 1992

[30] Foreign Application Priority Data

Oct. 9, 1991 [DE] Fed. Rep. of Germany ....... 4133358

[51] Int. Cl.$^5$ .......................... C08G 77/26; C08J 3/03
[52] U.S. Cl. ...................................... 524/837; 528/38; 524/804
[58] Field of Search ................... 524/837, 804; 528/38

[56] References Cited

U.S. PATENT DOCUMENTS

| | | | |
|---|---|---|---|
| 3,565,840 | 2/1971 | Mirabile et al. | 260/23 |
| 3,655,420 | 4/1972 | Tichenor | 117/138.8 A |
| 4,211,815 | 7/1980 | Deiner | 428/290 |
| 4,399,247 | 8/1983 | Cena et al. | 524/204 |
| 4,496,705 | 1/1985 | Florence et al. | 528/34 |
| 4,511,701 | 4/1985 | Ryang | 525/533 |
| 4,578,116 | 3/1986 | Rott et al. | 106/18.12 |
| 4,620,878 | 11/1986 | Gee | 106/287.15 |
| 4,874,662 | 10/1989 | Huhn | 428/266 |
| 4,978,561 | 12/1990 | Cray et al. | 427/387 |
| 4,990,267 | 2/1991 | Mickel et al. | 252/8.8 |
| 5,057,572 | 10/1991 | Chreebaczek et al. | 524/588 |
| 5,078,747 | 1/1992 | Kästele et al. | 8/181 |
| 5,118,535 | 6/1992 | Cray et al. | 427/387 |
| 5,133,897 | 7/1992 | Balzer | 252/312 |
| 5,183,845 | 2/1993 | Parkinson et al. | 524/726 |

FOREIGN PATENT DOCUMENTS

| | | |
|---|---|---|
| 0374471 | 11/1988 | European Pat. Off. . |
| 0300240 | 1/1989 | European Pat. Off. . |
| 0340575 | 11/1989 | European Pat. Off. . |
| 0342834 | 11/1989 | European Pat. Off. . |
| 0441530 | 7/1990 | European Pat. Off. . |
| 407042 | 1/1991 | European Pat. Off. . |
| 0342830 | 3/1991 | European Pat. Off. . |
| 0417047 | 3/1991 | European Pat. Off. . |
| 418479 | 3/1991 | European Pat. Off. . |
| 0437216 | 7/1991 | European Pat. Off. . |
| 442098 | 8/1991 | European Pat. Off. . |
| 1925993 | 11/1969 | Fed. Rep. of Germany . |
| 2824716 | 12/1979 | Fed. Rep. of Germany . |
| 3338663 | 5/1985 | Fed. Rep. of Germany . |
| 3730413 | 3/1989 | Fed. Rep. of Germany . |
| 3925846 | 2/1991 | Fed. Rep. of Germany . |
| 2215729 | 9/1989 | United Kingdom . |

OTHER PUBLICATIONS

Chem. Abstract, 109(6):39361n.
Chem. Abstract 115(10):94369v.
Chem. Abstract 93(2):9690c.
Chem. Abstract 114(22):208615j.
Chem. Abstract 99(6):39577n.
Chem. Abstract 109(2):7746a.
Chem. Abstract 108(6):39302y.

*Primary Examiner*—Melvyn I. Marquis
*Assistant Examiner*—D. Aylward
*Attorney, Agent, or Firm*—Kevin T. Mansfield; Edward McC. Roberts

[57] ABSTRACT

Stable, low-viscosity dispersions of polysiloxanes containing amino or amido groups can be obtained, even at comparatively high concentrations and/or pH values, by adding a product of the formula $$R1-CH(X)-Y-O-R2$$

($R1$ is H, $CH_3$; X=OH, $NH_2$; R2=C-$C_4$-alkyl, unsubstituted or substituted by OH or OR3; R3=$C_1$-$C_4$-alkyl, unsubstituted or substituted by OH) to the dispersions.

The dispersions are suitable for the treatment of fiber materials, especially textiles, to which a soft handle is thereby imparted.

7 Claims, No Drawings

AQUEOUS COMPOSITIONS COMPRISING NITROGEN-CONTAINING POLYSILOXANES

DESCRIPTION

The invention relates to an aqueous composition in the form of a solution or dispersion containing as component a) an organopolysiloxane carrying on average at least one radical R bonded to a silicon atom, said radical R being bonded to this silicon atom via a carbon atom and containing at least one amino group or one amido group. The invention further relates to a process for the preparation of such compositions and to the use of such compositions for the treatment of fiber materials.

It is known to treat fiber materials, especially textile fabrics, with aqueous dispersions of organopolysiloxanes in order to give the fiber materials advantageous properties such as a soft handle or water-repelling action. Organopolysiloxanes to which radicals containing amino groups are bonded have already been proposed for the purpose of achieving a soft handle. Organopolysiloxanes carrying substituents containing amindo groups, and their use for the treatment of fiber materials, are also already known from the state of the art. Said nitrogen-containing organopolysiloxanes are described for example in European patent application A-0 342 830, European patent application A-0 342 834, U.S. Pat. No. 4,620,878 (=European patent 0 138 192) and International patent application 88/08436. However, the dispersions mentioned in these patent specifications are not yet satisfactory in all respects.

Thus it has been found, for example, that with more highly concentrated dispersions of nitrogen-containing organopolysiloxanes, e.g. those containing more than 20% by weight of organopolysiloxane, there is a danger that the viscosity will reach high values, in many cases even during the preparation of the dispersion. This high viscosity, which occasionally attains the gel state, constitutes an appreciable disadvantage in the handling of the corresponding dispersions. In principle, the viscosity of these aqueous dispersions of nitrogen-containing organopolysiloxanes can be reduced in a number of cases by the addition of low-boiling, readily volatile solvents such as isopropanol, although the addition of such solvents is undesirable because of their low flash point. A further disadvantage arises when attempts are made, on the basis of the state of the art, to prepare aqueous dispersions of organopolysiloxanes to which substituents are bonded which contain piperazinyl radicals and/or substituted piperazinyl radicals. It has been found that when such dispersions are prepared by means of conventional dispersants and without other additives, they frequently have inadequate storage stabilities at pH values of more than about 5.0. On the other hand, pH values of more than 5.0 are often desirable since lower pH values can lead to difficulties when cellulose crosslinking agents are additionally to be used for the treatment of textile materials.

European patent application A-0 417 047 and European patent application A-0 374 471 described compositions which contain amino-functional siloxanes and an amphoteric surfactant and which can additionally contain certain (di)propylene glycols. Obviously it has hitherto been assumed that (di)propylene glycols are only to be used in conjunction with amphoteric and/or ionic surfactants. However, amphoteric and cationic surfactants have the disadvantage of promoting the yellowing tendency in many cases. Anionic surfactants have the disadvantage that compositions in which they are present often have a poor compatibility with conventional cellulose crosslinking agents, thereby limiting the use of such compositions for cellulose textiles.

The object of the present invention was therefore to provide aqueous compositions of nitrogen-containing organopolysiloxanes which are stable on storage, even at pH values higher than 5, including those containing piperazinyl radicals and/or substituted piperazinyl radicals, which compositions should not have an excessively high viscosity, even at higher concentrations, should cause a low yellowing tendency on textiles and should have a good compatibility with cellulose crosslinking agents.

The object was achieved by means of an aqueous composition in the form of a solution or dispersion according to the precharacterizing clause of claim 1, which composition is free from amphoteric, cationic and anionic surfactants and contains as component b) a compound of formula (I) or a mixture of compounds of formula (I):

in which
X is —OH or —NH2,

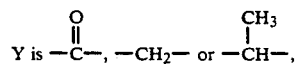

R1 is H or CH3,
R2 is an unbranched or branched alkyl radical having 1 to 4 carbon atoms, which can be substituted by an OH or OR3 group, and
R3 is an unbranched or branched alkyl radical having 1 to 4 carbon atoms, which can be substituted by an OH group.

Compositions of this type can advantageously be prepared by the process described in claim 11. This process as claimed in claim 11 is particularly suitable for the preparation of compositions in the form of dispersions of piperazino-functional organopolysiloxanes. Piperazino-functional organopolysiloxanes are understood as meaning polysiloxanes containing substituents carrying piperazinyl radicals and/or substituted piperazinyl radicals, e.g. polysiloxanes containing piperazine rings carrying N-alkyl groups, especially N-methyl groups, such as those described in claim 3. This process moreover makes it possible in many cases to obtain exceedingly stable, very small particles-containing to optically clear microemulsions. Microemulsions of organopolysiloxanes are particularly suitable for the treatment of textiles and are described inter alia in European patent 0 138 192 and International patent application 88/08436.

The compositions according to the invention have the following advantages:
1. They have good storage stabilities; this also applies at pH values of 5 to 7, which is desirable when the compositions are to be used to treat textiles made of cellulose fibers, with the concomitant use of cellulose crosslinking agents. In particular, organopolysiloxanes carrying substituents containing piperazine rings, which could not be converted to dispersions with storage stability at common concentrations and common pH values using methods known hitherto, can be obtained according to the invention in the form of stable dispersions. Above all, when the only dispersants used are non-ionic products, which all have an HLB value of more than 10, the compositions have stabilities which, in the opinion of those skilled in the art, were previously attainable only by using ionic and/or amphoteric surfactants.

2. They can be obtained as particularly stable microemulsions in many cases, especially in the case of their preparation by the novel inventive process as claimed in claim 11.
3. They do not contain any products with a low flash point as the viscosity-reducing component.
4. The use of the component b) mentioned in claim 1 makes it possible obtain more highly concentrated, stable dispersions, with an acceptable viscosity, of amino- and/or amido-functional organopolysiloxanes than was possible hitherto.
5. The treatment of textiles with the compositions according to the invention gives the textiles a pleasantly soft handle coupled with a rather unpronounced yellowing tendency, especially when piperazino-functional polysiloxanes are used.
6. The compositions have a good compatibility with commercially available cellulose crosslinking agents.

The aqueous compositions according to the invention contain as component a) an organopolysiloxane in which on average at least one radical R is bonded to a silicon atom. The expression "on average" means that it is also possible for individual organopolysiloxane molecules to be present which do not contain a radical R, but that the total number of radicals R present must be at least as large as the number of organopolysiloxane molecules. Organopolysiloxanes are understood as meaning compounds containing groups of the type

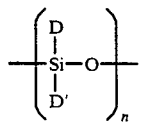

in which all the substituents D and D' are monovalent organic radicals and n is a number equal to at least 10. Both the radicals D and D' are preferably bonded to the respective silicon atom via a carbon atom. On average at least one of the radicals D or D' per molecule must be a radical R of the type mentioned in claim 1 and explained in greater detail below. It is also possible, however, for several of the radicals D and D' to be such a radical R, but preferably at most one radical R is bonded to one and the same Si atom. In a preferred embodiment of the compositions according to the invention, the organopolysiloxanes are derived from polydimethylsiloxanes, i.e. all the radicals D and D' in component a) which are not a radical R are preferably methyl groups. However, some or all of these radicals D and D' can also be longer alkyl radicals, e.g. those having 2 to 4 C atoms, or phenyl radicals. HO-Si(CH$_3$)$_2$ groups and/or trimethylsilyl groups are preferably located at the ends of the polysiloxane chain, but radicals R or longer alkyl radicals or phenyl groups can also be located at one or both ends of the chain. The polysiloxane chain is preferably unbranched and the number n of the units

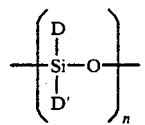

is preferably in the range from 50 to 1000.

In the compositions according to the invention, the organopolysiloxane (component a) contains on average at least one radical R per siloxane molecule. This radical R is a monovalent organic radical which is bonded to a siloxane chain. The radical R is preferably a side-chain of an unbranched organopolysiloxane, i.e. of an organopolysiloxane in which no Si atom has more than two oxygen atoms bonded to it. The organopolysiloxane can also contain on average more than one radical R per polysiloxane molecule, although preferably the same Si atom does not carry two radicals R. The radical R contains at least one amino or amido group, but it can also contain both an amino group and an amido group or several amino groups. A further possibility is for the organopolysiloxane to contain several different radicals R, some of which contain an amino group and others an amido group. The radical R is preferably a linear or branched organic radical which does not contain any carbon-carbon double or triple bonds. The amino group or amido group which the organopolysiloxane must contain can either be present in an open-chain radical R, i.e. in a radical which does not contain any homocyclic or heterocyclic rings, or it can be part of a heterocyclic ring. Non-aromatic heterocyclic rings without multiple bonds are particularly preferred here. If the radical R is open-chain and contains amino groups, primary or secondary amino groups are preferred. Particularly favorable results in respect of a soft handle are obtained when fiber materials are treated with compositions according to the invention in which the radical R either contains a piperazine ring or is a radical having one of the following formulae (II), (III) or (IV) (in the case of formula III there is the additional advantage that the yellowing tendency is even lower than in the other cases):

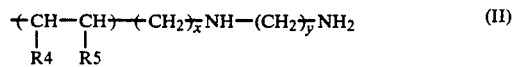

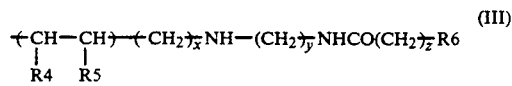

in which all the radicals R4, R5 and R7 independently of one another are hydrogen or a methyl group, except that at least one of the radicals R4 and R5 is hydrogen, x is a number from 0 to 3, t, y and z are each a number from 2 to 4 and R6 is hydrogen or a hydroxyl group.

If the radical R contains a piperazine ring, the radical R (present in component a)) is preferably a radical of the general formula

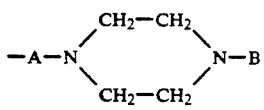

in which A is an alkylene radical having 1 to 6 carbon atoms, which can be interrupted by an —O—, —S— or —NH— bridge, and B is hydrogen or an alkyl radical having 1 to 4 carbon atoms, preferably CH3.

Polysiloxanes containing one or more of the following radicals each bonded to an Si atom:

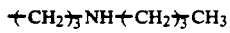

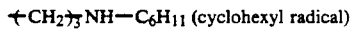

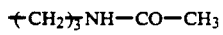

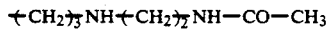

are also suitable as component a). In addition to the amino or amido groups described, the organopolysiloxanes used as component a) can contain other functional groups, e.g. hydroxyl groups or polyoxyethylene groups. These can either be part of the radical R or be present in addition to the radical R; in some cases they can also be bonded directly to an Si atom. Organopolysiloxanes containing hydroxyl groups or other functional groups can also be present in the compositions according to the invention in addition to the component a) described.

Organosiloxanes which contain a radical R and can be used as component a) are commercially available. Suitable products and their preparation are described in European patent application A-0 342 830, European patent application A-0 342 834, U.S. Pat. No. 4,620,878 (=European patent 0 138 192) and International patent application 88/08436 and in German patent application A-39 26 005, German patent application A-40 07 136, German patent application A-37 30 413, U.S. Pat. Nos. 3,655,420 and U.S. Pat. No. 4,496,705.

Other preferred organopolysiloxanes, namely those in which the radical R contains a piperazine ring, are known products. Suitable representatives and their preparation are described in European patent application A2-0 441 530; see also Chemical Abstracts 109(2):7746a (review of Japanese patent 63-67759), Chemical Abstracts 108(6):39302y (review of Japanese patent 62-210654), U.S. Pat. No. 4,511,701 and Chemical Abstracts 99(6):39577n.

In a preferred embodiment of the compositions according to the invention, certain ranges for the ratio of the number of radicals R present to the number of silicon atoms present are maintained in the organopolysiloxanes used as component a).

If the number of radicals R is small relative to this preferred range, the effect exerted by the radical R is not optimal in all cases; if the number is high, the costs of the products may increase without a significant enhancement of the effect. The favorable range for the average content of radicals R is reached when component a) contains on average 5 to 1000 silicon atoms to which a radical R is not bonded per silicon atom to which a radical R is bonded.

The value of this ratio (of Si atoms without radical R to Si atoms with radical R) which actually pertains to a particular polysiloxane can be determined by means of $^{29}Si$ NMR spectroscopy-if necessary in conjunction with a nitrogen and/or amino group determination. The value of this ratio can be controlled during the synthesis of corresponding organopolysiloxanes.

Apart from the organopolysiloxanes described (component a)), the compositions according to the invention must contain a further component b). This component b) is described in claim 1 and substances preferably used as component b) follow from claim 2. Component b) is decisive in achieving some of the advantages of compositions according to the invention, e.g. storage stability of dispersions of piperazino-functional organopolysiloxanes at pH values of more than 5, and reduction of the viscosities of dispersions in the case of higher concentrations of organopolysiloxanes. Component b) is a compound of formula (I) below or a mixture of several compounds covered by formula (I):

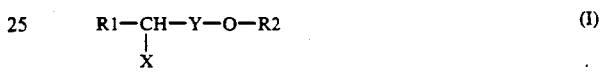

In this formula (I): X is —OH or —NH2,

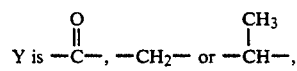

R1 is H or CH3,

R2 is an unbranched or branched alkyl radical having 1 to 4 carbon atoms, which can be substituted by an OH or OR3 group, and R3 is an unbranched or branched alkyl radical having 1 to 4 carbon atoms, which can be substituted by an OH group.

Preferred representatives of such compounds are methyl lactate (R1=CH3, X=OH, Y=CO, R2=CH3), ethyl lactate (R2=C2H5), isopropyl lactate and ethers derived from two molecules of propylene-1,2-glycol by the elimination of one molecule of water.

These ethers of propylene-1,2-glycol can be the following representatives of general formula (I):

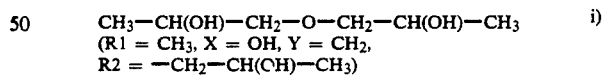

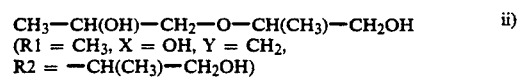

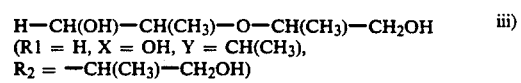

Very good results are also obtained with a mixture of these three isomers i), ii) and iii), as well as with a mixture of methyl lactate and one or more of the isomers i), ii) and iii). It is possible, for example, to use as component b) methyl lactate mixed with a mixture of the isomers i), ii) and iii). The reason why the compounds (component b)) listed in claims 1 and 2 result in said advantages of the compositions according to the invention, such as increased storage stability, is not known. The common structural unit

HO—C—C—OR2 and/or

H2N—C—C—OR2 may have a role to play here.

If the mixture of water and components a) and b) in the desired relative proportions does not give a homogeneous, stable aqueous solution or dispersion without other additives, the compositions according to the invention must also contain one or more dispersants in order to produce stable dispersions. In this case the compositions according to the invention preferably contain a dispersant or a mixture of dispersants as an additional component c). Component c) here is one or more non-ionic dispersants.

Examples of possible non-ionic dispersants are ethoxylated alcohols such as ethoxylated isotridecyl alcohol, ethoxylated fatty acids and ethoxylated fatty amines, especially ethoxylated products with an HLB value of more than 10. If mixtures of dispersants are used, all the individual constituents of this mixture preferably have an HLB value of more than 10.

Another suitable class of dispersants comprises alkylpolyglycosides. Alkylpolyglycosides suitable as dispersants for the dispersion of polydimethylsiloxanes are already known as commercially available products which have advantages over a number of other types of dispersants in respect of degradability and environmental properties. Alkylpolyglycosides of the formula L—O—$Z_n$ or L—C(O)—O—$Z_n$, inter alia, are suitable for use as component c) of the compositions according to the invention. L here is a linear or branched, saturated or unsaturated alkyl radical having 8 to 16 carbon atoms, Z is an oligoglycoside radical and n is on average a number from 1 to 5. Alkylpolyglycosides of the formula L—O—$Z_n$ are described in German patent application A1-39 25 846.

In another preferred embodiment of the compositions according to the invention, the latter also contain a component d) in addition to components a), b) and, if appropriate, c). Component d) is a dispersed polyethylene wax obtainable by dispersing a polyethylene wax after appropriate modification of the polyethylene. The modification can entail for example the formation of acid (-COOH) groups by oxidation. Suitable modified polyethylene waxes or polyethylene wax dispersions are commercially available and are described in European patent application A2-0 412 324 and in U.S. Pat. No. 4,211,815, German patent application A-2 824 716 and German patent application A-1 925 993. Said documents also include information on their preparation. The additional use of a dispersed polyethylene wax in the compositions according to the invention enables the amount of component a) to be kept somewhat lower, resulting in cost advantages. It also makes it possible, if desired, to influence the handle and surface of the fiber materials treated with the compositions. The amount of component a) which can be replaced with polyethylene wax, or the amount of polyethylene wax which can additionally be used without reducing the amount of component a), depends in each specific case on the demands made on the composition and/or on the finished textile.

A composition according to the invention preferably contains components a) to d) and water in the following relative proportions by weight:

| Component a): | 5 to 40 parts by weight |
| Component b): | 5 to 10 parts by weight |
| Component c): | 0 to 15 parts by weight |
| Component d): | 0 to 15 parts by weight |
| Water: | 40 to 80 parts by weight |

For components a) to d) these values relate to anhydrous products.

Compositions according to the invention can be prepared by conventional methods familiar to those skilled in the art, e.g. by taking water, a component b) and a dispersant or dispersant mixture and stirring in the organopolysiloxane (component a)), if necessary at elevated temperature and with the aid of suitable known homogenizing devices. If a component d) (polyethylene wax) is to be incorporated, it is recommended to disperse component d) on its own in a separate step and to combine the dispersion of the polyethylene wax with the separately prepared dispersion containing components a), b) and c). Processes for the preparation of dispersions containing amido-functional polysiloxanes and polyethylene waxes follow from European patent application A2-0 412 324.

A particularly preferred process for the preparation of compositions according to the invention comprises combining a component a), which contains a substituted or unsubstituted piperazinyl radical of the type described above, water and a component c), adjusting the pH to 3.5 to 4.0 by the addition of an acid, homogenizing the mixture at a temperature in the range from 60° to 110° C. and adding component b) and, if appropriate, component d). If a component d) (dispersed polyethylene wax) is added, this is conveniently carried out only after the mixture has cooled. The process step involving homogenization at 60° to 110° C. does not necessarily have to be an expensive homogenization using complicated devices; the homogenization can in some cases-depending on the type of system-be effected simply by gentle stirring for a short time. Thus "homogenization" in this connection means any suitable procedure for producing a homogeneous system.

The first step is thus to prepare a mixture of water, a piperazino-functional organopolysiloxane (component a) as described above) and a dispersant or dispersant mixture (component c)). The pH is adjusted to 3.5 to 4.0 by the addition of an acid, preferably a dilute aqueous solution of the acid, and the mixture is then homogenized at a temperature in the range from 60° to 110° C. The homogenization is effected by means of suitable devices and, if necessary, under elevated pressure. Strong mineral acids, especially sulfuric acid or hydrochloric acid, have proved particularly suitable as acids. After the homogenization, component b), namely a compound of formula (I):

$$R1—CH(X)—Y—O—R2 \qquad (I)$$

or a mixture of compounds of formula (I), is added. If a component d) (dispersed polyethylene wax) is to be used, it is also added after the homogenization, conveniently at room temperature in the form of a separately prepared dispersion.

The process described makes it possible in many cases to obtain compositions according to the invention in the form of particularly stable microemulsions; this is true primarily when the compositions do not contain component d). According to an advantageous variant, the process can be carried out by the following procedure:

After the homogenization, the pH of the dispersion is adjusted to a value of 5.5 to 7 by the addition of a base. The base is preferably added after cooling to room temperature. Bases which are particularly suitable for this purpose are strong bases such as sodium hydroxide or potassium hydroxide, which are conveniently used in the form of a dilute aqueous solution. Component b), e.g. methyl lactate or another compound of formula (I) or a mixture of such compounds, is conveniently added before the base, although it can also be added afterwards. If a dispersion of a polyethylene wax is to be incorporated, it is conveniently added only after the base.

The adjustment of the pH to 5.5 to 7 has the advantage that in this case dispersions according to the invention can be combined with conventional cellulose crosslinking agents and can then be used for the treatment of cellulose fiber materials, if appropriate after the addition of other agents and after dilution with water. Combining dispersions according to the invention with cellulose crosslinking agents makes it possible to obtain liquors which are stable even at elevated temperatures.

The compositions according to the invention are suitable for the treatment of fiber materials, especially textile fabrics made of fiber materials. In particular, the treatment of textile materials with compositions according to the invention produces articles with a pleasantly soft handle coupled with a rather unpronounced or non-existent yellowing tendency. The treatment of the fiber materials with compositions according to the invention can be carried out by known methods, e.g. in a padding process. If necessary, the compositions are diluted to a lower concentration with water before use. After treatment, the fiber or textile materials are processed further in known manner, e.g. dried and then, if appropriate, treated further at elevated temperature. Examples of textile materials which can advantageously be treated with compositions according to the invention are articles made of cellulose fibers or containing cellulose fibers. Other agents conventionally used for the treatment of fiber materials can also be added to the compositions according to the invention before use. Other textile finishing effects can be achieved in this way, if desired. Examples of known textile finishing agents which can be added to the dispersions according to the invention are cellulose crosslinking agents or known agents for imparting a soft handle, e.g. those based on fatty acid alkanolamides.

The invention will now be illustrated by means of practical Examples.

EXAMPLE 1 (according to the invention)

A mixture of 9.9 parts by weight of ethoxylated isotridecyl alcohol containing an average of 6 oxyethylene units, 2.1 parts by weight of an ethoxylated isotridecyl alcohol containing an average of 7 oxyethylene units, 40 parts by weight of water, 0.8 part by weight of 60% acetic acid and 36 parts by weight of an amino-functional polysiloxane was heated to 70° C., with stirring, and held at this temperature for 5 minutes. The polysiloxane used was a polydimethylsiloxane with trimethylsilyl end groups, in which some of the methyl radicals had been replaced with nitrogen-containing radicals having essentially formula (II) indicated above and in claim 4. This stirring for 5 minutes at 70° C. effected homogenization of the mixture.

10 parts by weight of a mixture of isomeric ethers, derived from 2 molecules of propylene-1,2- glycol by the elimination of 1 molecule of water, were added to the mixture at 70° C.

EXAMPLE 2 (Comparative Example not according to the invention)

Example 1 was repeated with the following modifications: The mixture of isomeric ethers of propylene-1,2-glycol was not added and the amount of water used was 50 parts by weight (instead of 40 parts by weight), so the resulting end product contained the same percentage of polysiloxane and emulsifiers as in Example 1. The data for the products obtained according to Example 1 and Example 2 are compared below:

| Product type | Example 1 thin transparent dispersion | Example 2 transparent paste |
| --- | --- | --- |
| pH | 5.3 | 5.2 |
| NTU | 42.3 | 40.9 |
| Viscosity (cP) | 310 | 200,000 |
| Dilutability | good | poor |

The viscosity was measured with a Brookfield viscometer. The NTU (nephelometric turbidity unit) represents a measure of the optical turbidity of a sample. It was measured with an "Analite" nephelometer from Novasina AG, Pfäffikon, Switzerland.

EXAMPLE 3 (according to the invention)

10 parts by weight of an isotridecyl alcohol containing an average of 6 oxyethylene units, 61 parts by weight of water, 0.55 part by weight of 30% hydrochloric acid and 15 parts by weight of a piperazino-functional polysiloxane were heated to 70° C., with stirring, and held at this temperature for 5 minutes. The mixture was then cooled to room temperature and 10 parts by weight of methyl lactate were added. After the addition of the methyl lactate, the mixture was stirred for a few minutes more at room temperature. 1.4 parts by weight of 10% sodium hydroxide solution were then added.

EXAMPLE 4 (Comparative Example not according to the invention)

Example 3 was repeated with the following modifications:

Methyl lactate was not added and the amount of water used was 71 (instead of 61) parts by weight.

The polysiloxane used in Examples 3 and 4 had essentially the formula indicated on page 6, line 55, of European patent application A2 0 441 530. The dispersion obtained according to Example 3 was clear and transparent (NTU=47) and had a pH of 6.0. The dispersion obtained according to Example 4 was very turbid (NTU=180) and also had a pH of 6.0.

EXAMPLE 5 (according to the invention)

A mixture of 20 parts by weight of an alkylpolyglycoside (dispersant), 60 parts by weight of water, 2 parts by weight of 60% acetic acid and 15 parts by weight of a polysiloxane was heated to 70° C., with stirring, and held at this temperature for 5 minutes. 3 parts by weight of methyl lactate were added to the mixture at 70° C.; the mixture was then cooled to room temperature to give a transparent, slightly yellowish dispersion (NTU=18). The polysiloxane used contained, as side-chains, N-cyclohexyl-3-aminopropyl radicals bonded to Si atoms. Such products are described in German patent application A1 37 30 413. The alkylpolyglycoside used was a product of the type described in German patent application A1 39 25 846 and had the general formula L-O-$Z_n$, L being an alkyl radical having an average of 10 to 12 carbon atoms and Z being an oligoglucoside radical.

What is claimed is:

1. An aqueous composition in the form of a solution or a dispersion, which consists essentially of
   (a) 5 to 40 parts by weight of an organopolysiloxane with on average at least one monovalent organic radical, R, which is bonded to a silicon atom via a carbon atom and which comprises at least one amino or amido group;
   (b) 5 to 10 parts by weight a compound of formula I or a mixture of compounds of formula I;

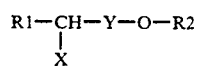 (I)

in which
   X is —OH or —NH$_2$,

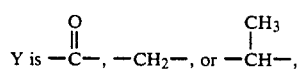

R1 is H or CH$_3$,
   R2 is an unbranched or branched alkyl radical having 1 to 4 carbon atoms, which can be substituted by an OH or OR3 group, and
   R3 is an unbranched or branched alkyl radical having 1 to 4 carbon atoms, which can be substituted by an OH group,
   (c) 0 to 15 parts by weight of a nonionic dispersant;
   (d) 0 to 15 parts by weight of a dispersed polyethylene wax; and 40 to 80 parts by weight of water.

2. A composition as claimed in claim 1 wherein component b) is methyl lactate, ethyl lactate, isopropyl lactate or an ether derived from two molecules of propylene-1,2-glycol by the elimination of 1 molecule of water, or component b) is a mixture of such compounds.

3. A composition as claimed in claim 1 wherein the radical R present in component a) is a radical of the general formula

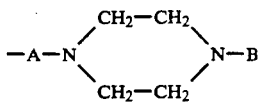

in which A is an alkylene radical having 1 to 6 carbon atoms, which can be interrupted by an —O—, —S— or —NH— bridge, and B is hydrogen or an alkyl radical having 1 to 4 carbon atoms, preferably CH$_3$.

4. A composition as claimed in claim 1 wherein the radical R present in component a) is a radical of general formula (II), (III), or (IV):

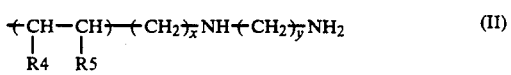 (II)

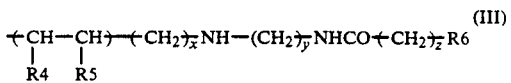 (III)

 (IV)

in which all the radicals R4, R5 and R7 independently of one another are hydrogen or a methyl group, except that at least one of the radicals R4 and R5 is hydrogen, x is a number from 0 to 3, t, y and z are each a number from 2 to 4 and R6 is hydrogen or a hydroxyl group.

5. A composition as claimed in claim 1 wherein component a) is a polydimethylsiloxane in which one or more methyl groups, but at most one methyl group on one and the same Si atom, have been replaced in each case by one radical R.

6. A composition as claimed in claim 1 wherein component a) contains on average 5 to 1000 silicon atoms to which a radical R is not bonded per silicon atom to which a radical R is bonded.

7. A composition as claimed in claim 1 which contains an alkyl polyglycoside as component (c).

* * * * *